United States Patent
Jones et al.

(10) Patent No.: US 6,835,076 B2
(45) Date of Patent: Dec. 28, 2004

(54) ELECTRICAL CONNECTOR ASSEMBLY

(75) Inventors: Randall T. Jones, Shaker Hts, OH (US); Timothy Simmons, III, Madison Hts, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/674,229

(22) Filed: Sep. 29, 2003

(65) Prior Publication Data

US 2004/0110402 A1 Jun. 10, 2004

Related U.S. Application Data

(60) Provisional application No. 60/414,846, filed on Sep. 30, 2002.

(51) Int. Cl.[7] ............................................. H01R 13/44
(52) U.S. Cl. ..................................... 439/137; 439/145
(58) Field of Search ................................ 439/137, 136, 439/140, 141, 145, 378

(56) References Cited

U.S. PATENT DOCUMENTS

| | | | |
|---|---|---|---|
| 771,410 A | * 10/1904 | Beerwald | 439/137 |
| 4,176,897 A | * 12/1979 | Cameron | 439/138 |
| 4,528,429 A | * 7/1985 | Dobson et al. | 200/50.28 |
| 4,722,693 A | * 2/1988 | Rose | 439/137 |
| 4,775,327 A | * 10/1988 | Normann et al. | 439/140 |
| 4,867,694 A | * 9/1989 | Short | 439/137 |
| 4,940,430 A | 7/1990 | Fujitani et al. | |
| 5,020,997 A | * 6/1991 | Calderara et al. | 439/137 |
| 5,037,319 A | 8/1991 | Hatagishi | |
| 5,230,636 A | 7/1993 | Masuda et al. | |
| 5,281,156 A | * 1/1994 | Yi | 439/137 |
| 5,332,396 A | 7/1994 | Kaneko et al. | |
| 5,466,171 A | * 11/1995 | Bixler et al. | 439/378 |
| 5,620,329 A | 4/1997 | Kidd et al. | |
| 5,634,810 A | * 6/1997 | Niitsu et al. | 439/378 |
| 5,702,259 A | * 12/1997 | Lee | 439/137 |
| 5,746,612 A | * 5/1998 | Chien-Yuan | 439/139 |
| 5,885,088 A | * 3/1999 | Brennan et al. | 439/680 |
| 5,915,981 A | * 6/1999 | Mehta | 439/137 |
| 5,993,247 A | 11/1999 | Kidd | |
| 6,086,385 A | 7/2000 | Wang et al. | |
| 6,142,813 A | 11/2000 | Cummings et al. | |
| 6,149,446 A | * 11/2000 | Yu | 439/137 |
| 6,162,085 A | 12/2000 | Chugh et al. | |
| 6,171,146 B1 | 1/2001 | Fink et al. | |
| 6,179,658 B1 | 1/2001 | Gunay et al. | |
| 6,203,364 B1 | 3/2001 | Chupak et al. | |
| 6,208,233 B1 | 3/2001 | Stein, Sr. et al. | |
| 6,224,401 B1 | * 5/2001 | Yu | 439/139 |
| 6,238,224 B1 | * 5/2001 | Shao | 439/137 |
| 6,247,951 B1 | 6/2001 | Di Liello et al. | |
| 6,247,965 B1 | 6/2001 | Cummings et al. | |
| 6,250,703 B1 | 6/2001 | Cisler et al. | |
| 6,305,957 B1 | 10/2001 | Fink et al. | |
| 6,338,651 B1 | 1/2002 | Svette, Jr. et al. | |
| 6,345,706 B1 | 2/2002 | Oliver et al. | |

(List continued on next page.)

Primary Examiner—Tho D. Ta
Assistant Examiner—Larisa Tsukerman
(74) Attorney, Agent, or Firm—David P. Wood (57) ABSTRACT

An electrical connector assembly is provided that includes a first connector having a slidable cover and alignment post receiving sockets, a second connector constructed with alignment posts, and a flexible mounting bracket. The cover protects terminals mounted in the first connector from dirt and debris when the connector is in an unmated state. As the second connector is engaged with the first connector, angled surfaces on the alignment posts of the second connector cooperate with chamfered surfaces on the first connector to guide a misaligned second connector into the first connector. Angled surfaces on the alignment posts and cover cooperate to move the cover exposing the terminals on the first connector for electrical connection with terminals on the second connector.

20 Claims, 6 Drawing Sheets

U.S. PATENT DOCUMENTS

| | | |
|---|---|---|
| 6,406,307 B2 | 6/2002 | Bungo et al. |
| 6,435,891 B1 | 8/2002 | Beck, Jr. et al. |
| 6,443,137 B1 | 9/2002 | Kraft et al. |
| 6,454,060 B1 | 9/2002 | Lisenker et al. |
| 6,494,751 B1 | 12/2002 | Morello et al. |
| 6,508,666 B1 | 1/2003 | Francis |
| 6,533,588 B1 | 3/2003 | Woith et al. |
| 6,533,611 B2 | 3/2003 | Morello et al. |
| 6,535,396 B1 | 3/2003 | Degenkolb et al. |
| 6,556,118 B1 | 4/2003 | Skinner |
| 6,565,372 B2 | 5/2003 | Bakker et al. |
| 6,578,444 B1 | 6/2003 | Wendelin |

\* cited by examiner

ELECTRICAL CONNECTOR ASSEMBLY

CROSS-REFERENCE TO RELATED APPLICATIONS

This application claims priority from U.S. provisional patent application Ser. No. 60/414,846, filed Sep. 30, 2002, which is hereby incorporated by reference.

TECHNICAL FIELD

The present invention relates to electrical connectors and more particularly to systems for providing electrical connection between components and other structures in environments that are prone to connector misalignment and/or contamination or leakage.

BACKGROUND OF THE INVENTION

The need to transmit electrical power and information (e.g., signal current, voltage, and/or time-dependent variations in electrical properties) extends to a wide variety of movable and removable structures. For example, in the manufacture and assembly of many common products, modular components may be manufactured remotely from one another and later assembled to create a finished product. During assembly, it is often advantageous to accommodate movement of components after they have been electrically connected. Later, it may be further advantageous to accommodate removal or further movement of the component for adjustment or servicing. For example, in automobiles, such components may include moveable and removable seats, doors, hoods, trunk lids, windows, sun/moon roofs, pumps, motors, alternators, and the like. While vehicles such as automobiles provide convenient examples to illustrate this need, however, it is easy to contemplate similar requirements in other applications such as computers, consumer electronics, and medical instruments and devices. For example, this need exists and is increasing in items such as LCD screens, DVD players, entertainment systems, communication devices, electrical auxiliary outlets, and data communication for Internet access and networking, and other applications where components are docked or otherwise mounted to other structures.

In many applications it is desirable to automatically make an electrical connection to a movable or removable structure while the structure is being physically attached to a supporting structure, such as a floor or dock. However, in these types of applications it is often difficult or expensive to ensure that a conventional electrical connector is correctly aligned for mating. For example, it may be difficult to visually align the connectors because their view is obscured by the components themselves. In addition to causing difficulty in aligning connectors, the inability to clearly view or access a connector may also exacerbate problems associated with contamination. For example, in many cases, the internal components of conventional connector bodies may be exposed to dirt, dust, debris, and other contaminants. Conventional electrical connectors, however, often lack protection from dirt, dust, and debris. Without the ability to visually inspect such unprotected connectors, however, contamination may be impossible to detect. In many environments, contamination may also be difficult to prevent—even if it can be effectively detected.

U.S. Pat. No. 6,250,703 to Cisler, et al, which is hereby incorporated by references for background purposes, discloses a connector for a removable vehicle power seat. In Cisler, a female-like socket connector engages a vehicle mounted male-like pin connector when the seat is latched to the vehicle. It has been found, however, that such electrical connectors are prone to contamination from dirt, dust, debris, water, chemicals and other foreign matter—especially when the connector is not seated, such as when a seat is not mounted to the floor.

In addition to preventing foreign material from entering a connector, it may also be desirable to prevent leakage (e.g., of corrosion inhibiting compounds, dielectric compounds, electromagnetic radiation, and the like) from unmated connectors. It may also be advantageous to minimize the potential for electrical contact (e.g., unintentional grounding, application of excessive voltage) with the electrical contacts within a connector.

In addition, known moveable connection systems in general, and power removable seat connection systems in particular, lack mechanisms to bring unaligned connectors into alignment during mating. Although efforts may have been made to provide features that might facilitate alignment through, for example, flexibility of connectors or their mounts, no connection system or method currently exists for guiding a misaligned set of connectors into alignment.

Accordingly, it would be advantageous to have an electrical connection system and method whereby a misaligned set of connectors might be easily guided into alignment. It would also be advantageous if such an electrical connection system and method would minimize its susceptibility to contamination, particularly when the connectors are in an unmated state, while sufficiently exposing the contact surfaces of the connectors for effective mating. It would also be advantageous to have an electrical connection system and method that could prevent or minimize leakage from an electrical connector when it is unmated. It would further be advantageous to have an electrical connection system and method that could minimize the potential for undesirable electrical contact with electrical contacts of a connector when the connector is unmated.

SUMMARY OF THE INVENTION

The methods and apparatus of the present invention address many of the shortcomings of the prior art. In accordance with various aspects of the present invention, methods and systems provide improved electrical interconnection with and among components as well as with and among other structures while overcoming many of the deficiencies of the prior art.

In one aspect, the invention provides a self-aligning electrical connector assembly providing protection from contamination, electrical contact, and/or leakage. In an exemplary embodiment, a connector assembly includes an insulative housing, at least one terminal accommodated in the housing, and a cover slidably retained by the housing. The cover may be of an electrically insulating material and may be adapted to prevent contamination within the housing, to prevent leakage out of the housing, or to prevent undesired electrical contact within the housing. The housing defines an opening for receiving a mating element. The terminal has a contact portion exposed for mating through the opening with a mating element. To provide protection from contamination, electrical contact, and/or leakage, when located at a first position, the cover covers the contact portion at the opening. Finally, the cover is movable to a second position relative to the housing to expose the contact portion for electrical contact with the mating element.

In one exemplary embodiment, an electrical connector also includes a spring that biases the cover toward the first position and that is retained by the housing. In another exemplary embodiment, the housing is adapted to receive the mating element along a connection axis, and the cover is movable along a sliding axis that lies non-parallel to the connection axis. The housing may defined an outer periphery such that the cover is movable entirely within the outer periphery.

In another exemplary embodiment, an electrical connector also includes a female alignment member that comprises a socket for receiving a male alignment member. In this embodiment, the female alignment member may include a passageway extending between the socket and a passageway opening that is defined by a chamfered rim to receive the male alignment member and to facilitate alignment of a misaligned male alignment member during mating.

In another exemplary embodiment, the cover has a forward end facing a direction of movement from the second position toward the first position, and the cover includes an inclined surface portion on a first side. In this embodiment, the inclined surface portion faces away from the cavity opening and slopes toward a second side opposite the first side and toward the forward end. Optionally, the inclined surface portion may extend to the forward end of the cover.

In another embodiment, an electrical connector comprises a first connector member and a second connector member. The first connector member comprises an insulative first housing adapted to receive at least one conductive first terminal. The second connector member comprises an insulative second housing, which defines a cavity having a cavity opening adapted to receive the first terminal. The second housing is also adapted to receive at least one conductive second terminal having a contact portion exposed in the cavity for electrically contacting the first terminal. In accordance with this embodiment, the second connector member further comprises a cover slidably retained by the second housing, and, when located at a first position the cover covers the contact portion at the cavity opening. The cover has a surface exposed for mating whereby upon an insertion movement of the first connector member with respect to the second connector member, the first connector member moves the cover toward a second position, exposing the cavity opening for the first terminal to enter the cavity and electrically contact the second terminal.

In one exemplary embodiment, the cover is movable along a path that is in nonparallel relation to a connection axis, along which the insertion movement extends. In another exemplary embodiment, the cover is moveable entirely within an outer periphery defined by the second housing.

In yet another exemplary embodiment, an electrical connector also comprises a flexible mounting bracket attached to one of the first and second connector members such that the connector member is free to move in both an X and a Y direction that extend orthogonally with respect to the connection axis. In accordance with this embodiment, the first connector member further comprises a male alignment member, and the second connector member further comprising a female alignment member. Accordingly, during insertion movement, the male and female alignment members cooperate with each other such that one of the first and second connector members is free to move in an X and a Y direction into alignment with the other of the first and second connector members. The male alignment member may also comprise a projection, and the female alignment member may comprises a passageway extending to a passageway opening, which may be defined by a chamfered rim to facilitate alignment of a misaligned male alignment member during mating, for receiving the projection. Optionally, the cover may have a forward end facing a direction of movement from the second position toward the first position. The cover may include an inclined surface portion on a first side that faces away from the cavity opening. In addition, the inclined surface portion may be sloping toward a second side opposite the first side and toward the forward end. Accordingly, during the mating movement, the male alignment member may abut the inclined surface portion, thereby causing the cover to move from the first position toward the second position.

In another exemplary embodiment, an electrical connector includes a first connector member and a second connector member. The first connector member includes an insulative first housing, in which at least one conductive first terminal is mounted. The second connector member includes an insulative second housing that defines an opening adapted to receive the first terminal. At least one conductive second terminal may be mounted in the second housing, and the second terminal may have a contact portion exposed in the opening for electrically contacting the first terminal. The second connector member also includes a cover that is slidably secured to the second housing, that generally covers the opening when located at a first position, and that is movable to a second position to expose the contact portion for electrical contact with the first terminal.

Accordingly, various embodiments of the invention enable a first connector to be mounted on a floor, guide rail, and other structures. The cover protects terminals exposed through a cavity opening in the first connector housing from contamination by dirt, dust, debris, liquids and other foreign matter when the connector is in an unmated state. As the first and second connectors are mated, movement of the second connector into the first connector causes angled surfaces on the alignment posts of the second connector to engage angled surfaces on the cover thereby sliding the cover away from the cavity opening. Angled surfaces on the alignment posts also cooperate with angled surfaces at the edge of alignment post receiving sockets to guide a misaligned second connector into the first connector. A spring loaded into a cover retainer portion of the first connector pushes the cover back into place when the second connector is disengaged from the first connector.

These and other features and advantages of the present invention will become apparent from the following brief description of the drawings, detailed description, and appended drawings.

BRIEF DESCRIPTION OF THE DRAWINGS

The above-mentioned objects and features of the present invention can be more clearly understood from the following detailed description considered in conjunction with the following drawings, in which like numerals represent like elements and in which.

DETAILED DESCRIPTION OF THE INVENTION

As discussed above, the methods and systems of the present invention provide improved electrical connection whereby a misaligned set of connectors might be easily guided into alignment and whereby susceptibility to contamination may be minimized, particularly when the connectors are in an unmated state while sufficiently exposing the contact surfaces of the connectors for effective mating. In addition, the present invention provides electrical connection while effectively reducing the potential for leakage from an electrical connector, as well as the potential for undesirable electrical contact with electrical contacts of a connector, when the connector is unmated.

Referring to the figures, wherein like numerals refer to like elements throughout the several views, FIGS. 1–10 illustrate various exemplary embodiments of electrical connector assembly 10 in accordance with the present invention. Electrical connector assembly 10 includes first connector 12, second connector 14, and mounting bracket 16. Connection axis A extends along a line corresponding to a direction of mating and unmating of first and second connectors 12, 14.

Figure 1:
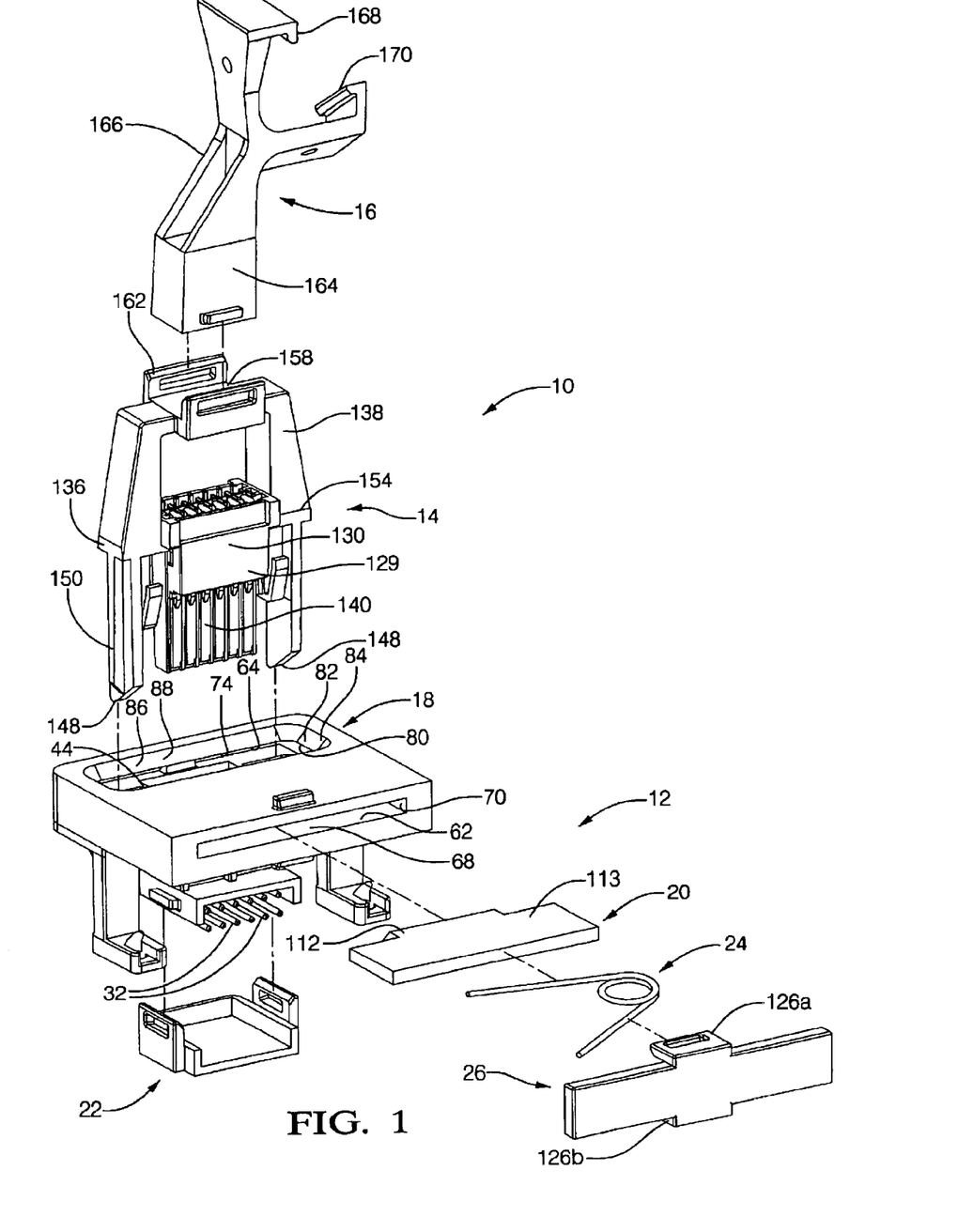
FIG. 1 illustrates an exploded perspective view of a connector assembly in accordance with an exemplary embodiment of the present invention.
Figure 2:
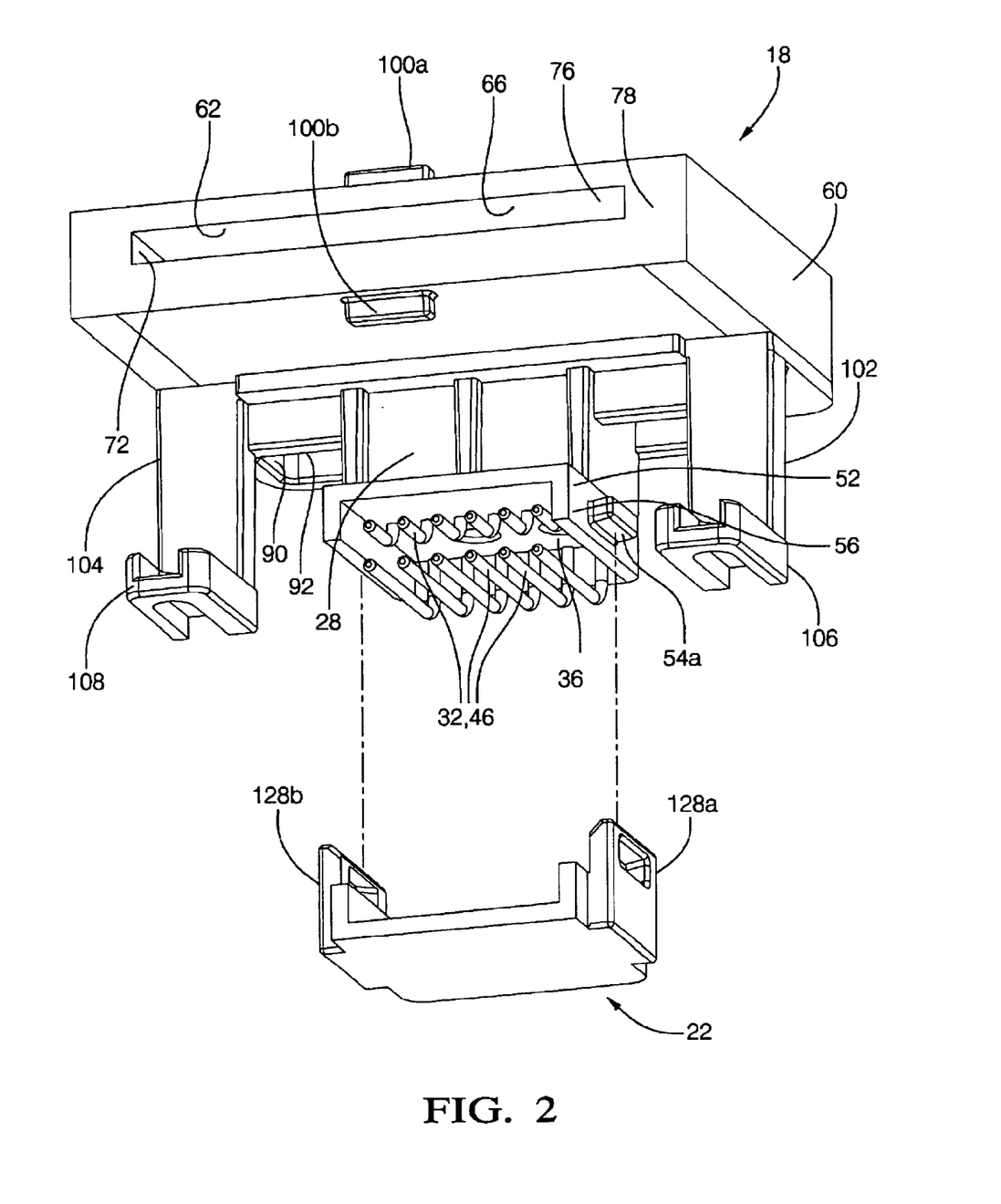
FIG. 2 illustrates a perspective view of one aspect of the connector assembly in accordance with an exemplary embodiment of the present invention.
Figure 3:
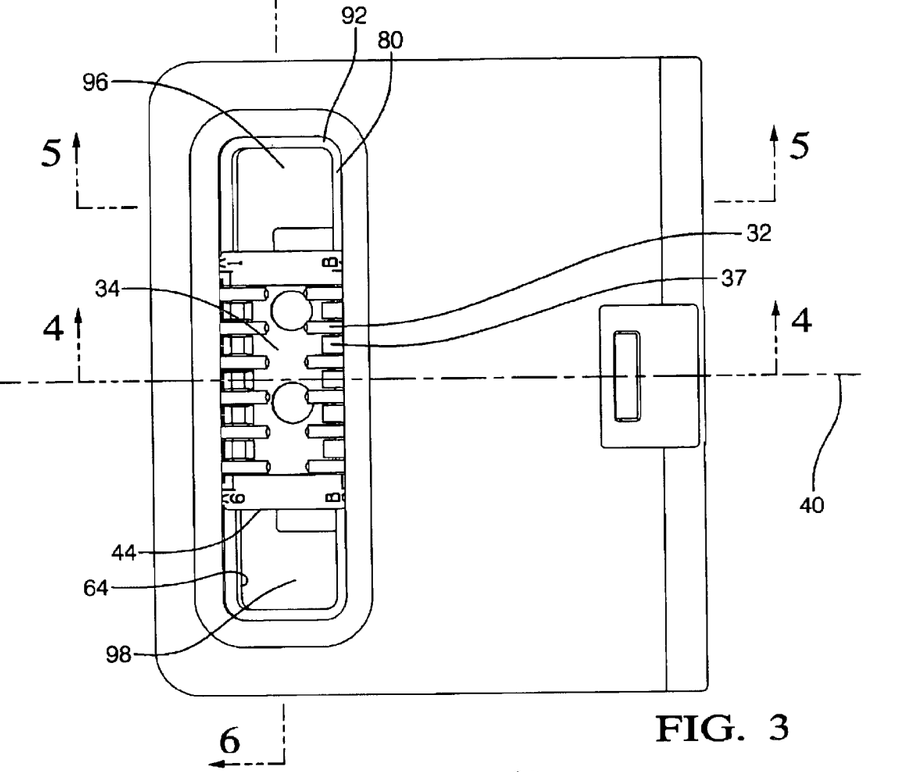
FIG. 3 illustrates a top plan view of a first connector member of a connector assembly in accordance with an exemplary embodiment of the present invention.
Figure 4:
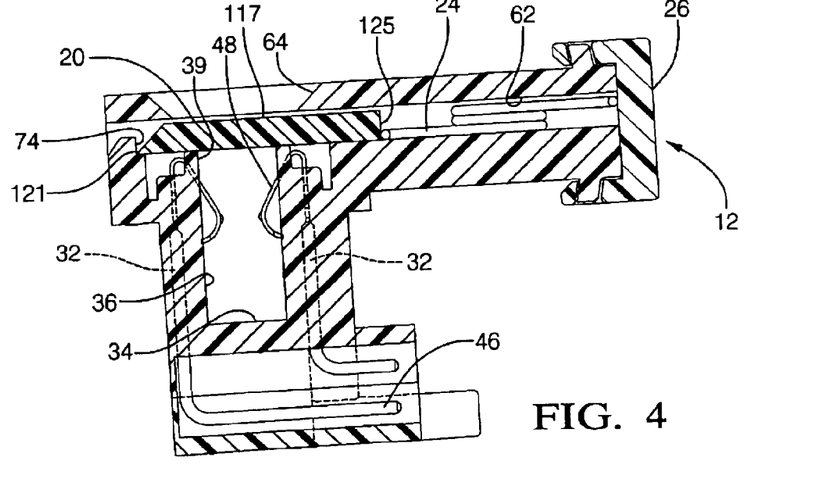
FIGS. 4, 5, and 6 illustrate cross-sectional views of a first connector of FIG. 3 taken along section lines 4—4, 5—5, and 6—6, respectively.
Figure 5:
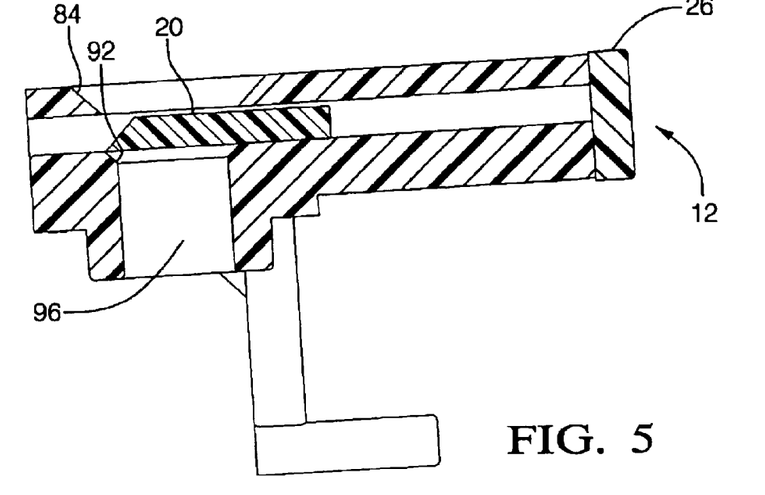
Figure 6:
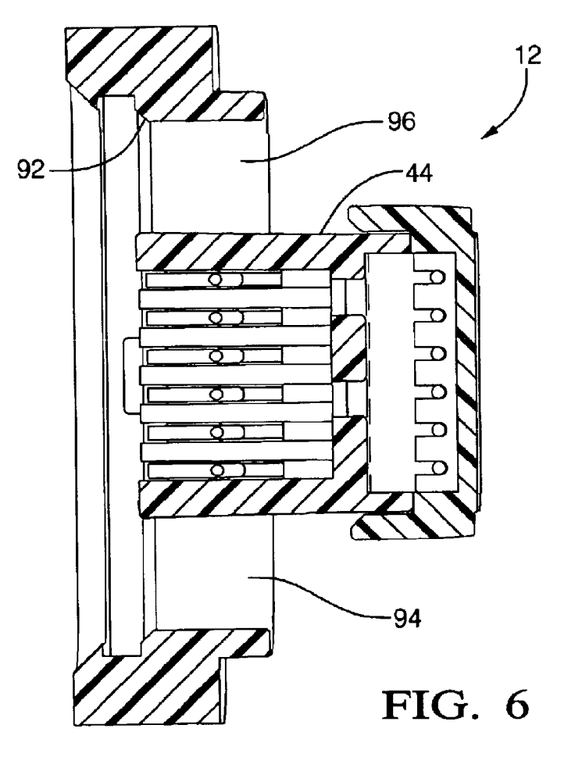
Figure 7:
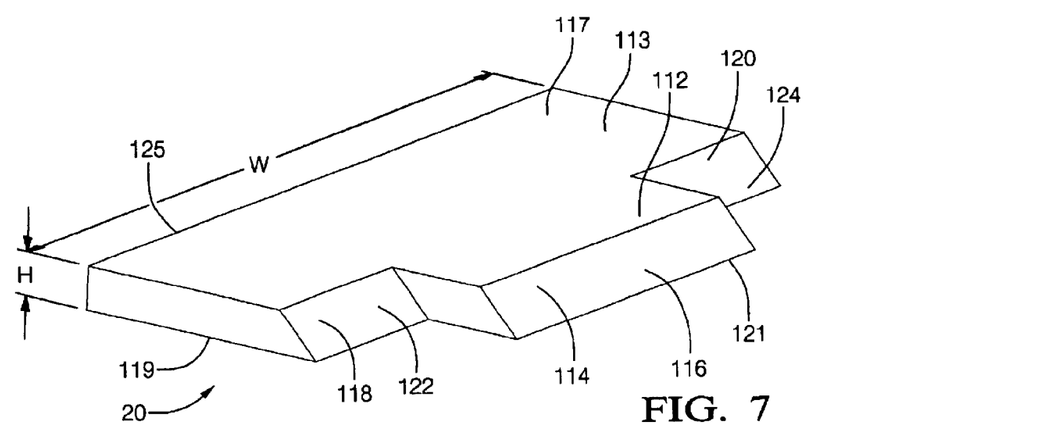
FIG. 7 illustrates a perspective view of a cover of a connector assembly in accordance with an exemplary embodiment of the present invention.
Figure 8:
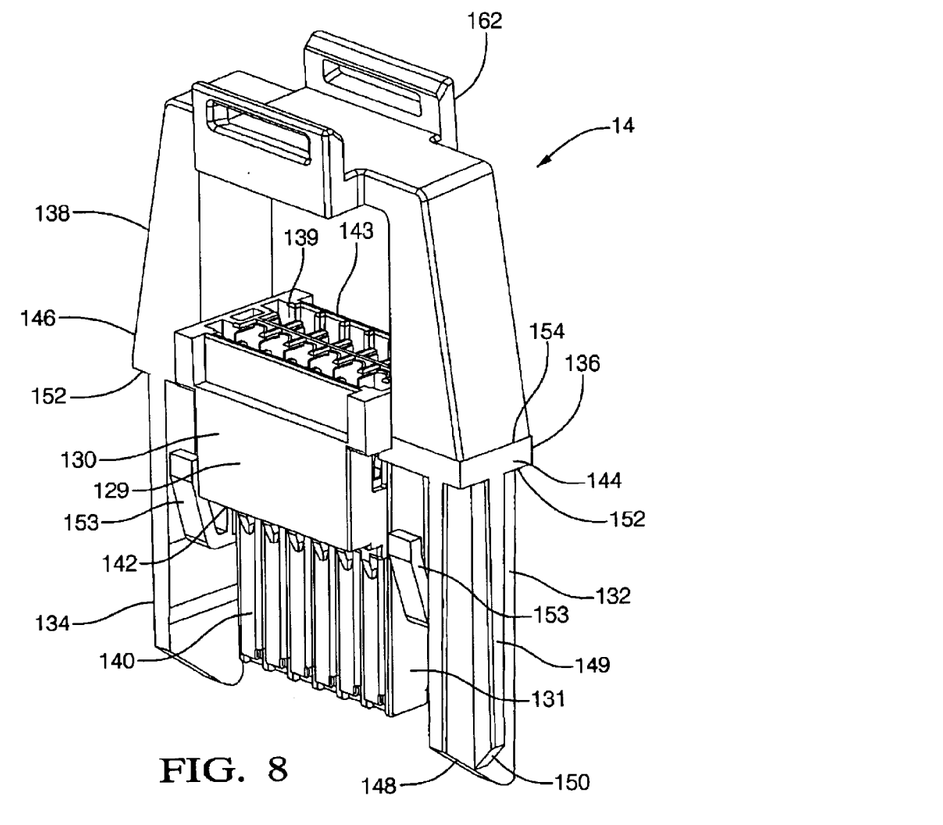
FIG. 8 illustrates a perspective view of a second connector member of a connector assembly in accordance with an exemplary embodiment of the present invention.
Figures 9, 10:
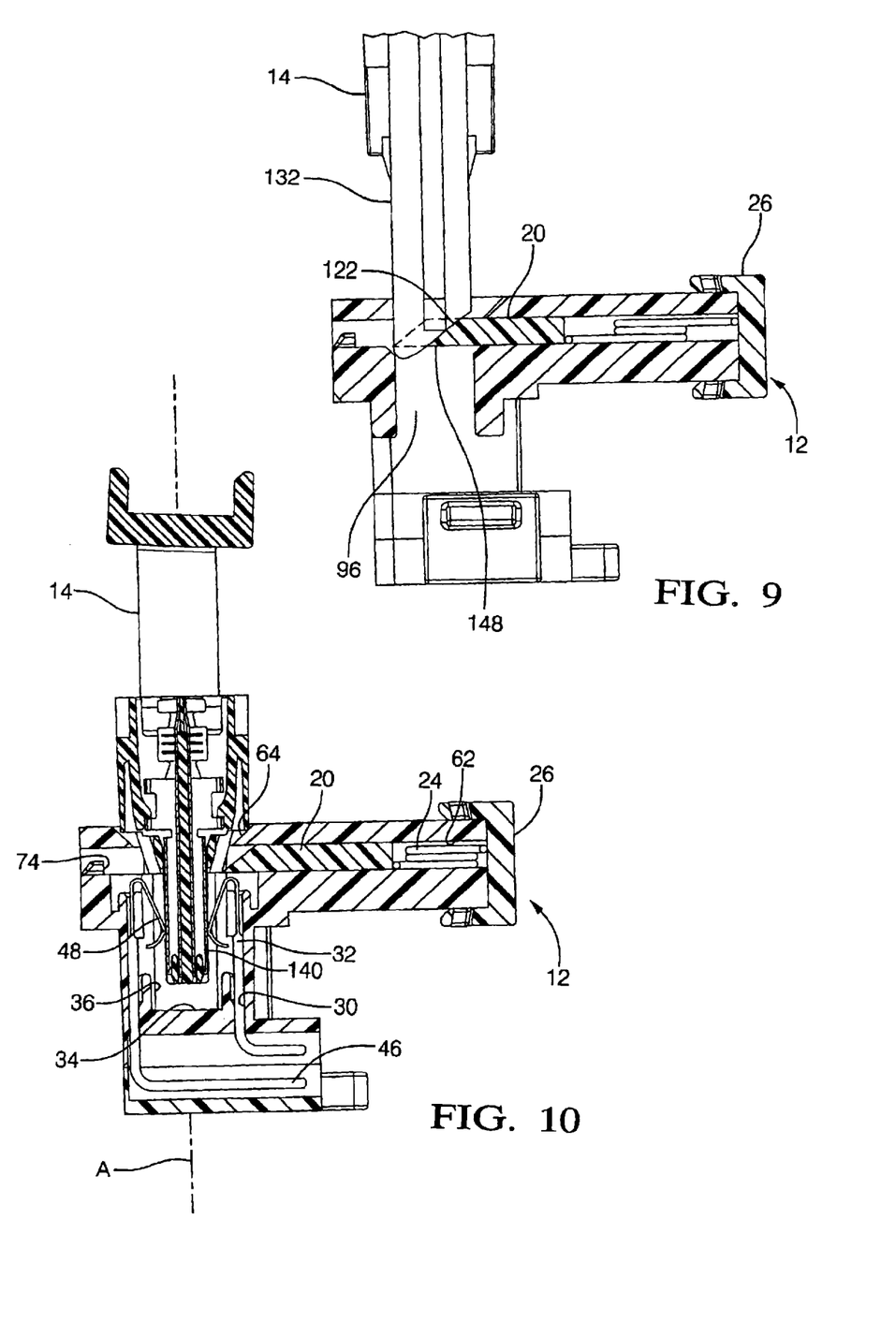
FIG. 9 illustrates a cross-sectional view of a partially mated connector assembly in accordance with an exemplary embodiment of the present invention.
FIG. 10 illustrates a cross-sectional view of a mated connector assembly in accordance with an exemplary embodiment of the present invention.

First connector 12 includes insulative housing 18, slidable cover 20, shroud floor 22, spring 24 and end cap 26.

First connector housing 18 has body portion 28 with plurality (12 shown on FIG. 3) of first terminal containment passageways 30 formed therein for receiving associated first metal terminal 32. Plurality of first terminal containment passageways 30 extend in parallel with respect to connection axis A through bottom wall 34 of body portion 28. Plurality (10 shown on FIG. 3) of retaining walls 37 extend upwardly from locations between passageway 30 openings in parallel with respect to connection axis A from bottom wall 34. Retaining walls 37 provide partial containment for each of first metal terminals 32 which extend through first terminal containment passageways 30. Retaining walls 37 also separate adjacent first terminals 32. Mating connector receiving chamber or cavity 36 is formed within body portion 28 extending upwardly in parallel with respect to connection axis A from bottom wall 34 to cavity opening 39. Body portion 28 includes side walls 44. Each of first terminals 32 has attachment portion 46 at first end portion for attachment to associated wire (not shown) and electrical contact portion 48 at second end portion for electrical contact with corresponding second metal terminal 140 (shown on FIG. 8) in second connector 14. Electrical contact portion 48 of each first terminal 32 extends into receiving cavity 36.

First connector housing 18 has shroud portion 52 extending outwardly from body portion 28. Shroud portion 52 partially surrounds attachment portion 46 of each of plurality of first metal terminals 32. Shroud portion 52 includes first and second latching protrusion 54a (second protrusion not shown) extending from shroud portion side walls 56. First and second latching protrusions 54a (second protrusion not shown) are used for latching shroud floor 22 to shroud portion 52.

First connector housing 18 has cover retainer portion 60 extending outwardly from body portion 28. Cover retainer portion 60 includes cover containment slot 62 which extends along sliding axis 40. Sliding axis 40 extends orthogonally with respect to connection axis A. Cover retainer portion 60 also includes connector receiving passageway 64, which extends in parallel with respect to connection axis A. Connector receiving passageway 64 communicates with receiving cavity 36. Cover containment slot 62 communicates with connector receiving passageway 64.

Cover containment slot 62 is defined by cover holder ceiling 66, cover holder floor 68, first cover holder side wall 70, second cover holder side wall 72, and cover holder first end wall or first stop 74. Second end 76 of cover containment slot 62 is open at second end 78 of cover retainer portion 60 for receiving cover 20 and spring 24. Cover holder floor 68 has floor opening 80 and cover holder ceiling 66 has ceiling opening 82 where mating connector receiving passageway 64 extends through cover containment slot 62. Ceiling opening 82 is defined by first rim 84 in cover holder ceiling 66. Side walls 86 of mating connector receiving passageway 64 have angled or chamfered surface 88 at ceiling opening 82. Floor opening 80 is defined by second rim 92. Second rim 92 cooperates with side walls 44 of body portion 28 to define first alignment post receiving socket 96 and second alignment post receiving socket 98 (shown on FIG. 6). Floor opening 80 also extends to cavity opening 39. Cavity opening 39, floor opening 80, and ceiling opening 82 are aligned along connection axis A.

Third latching protrusion 100a extends from cover holder ceiling 66 at a location near second end 78 of cover retainer portion 60. Fourth latching protrusion 100b extends from cover holder floor 68 near second end 78 of cover retainer portion 60. Protrusions 100a, 100b are used for latching end cap 26 to cover retainer portion 60.

First connector housing 18 also has first and second mounting legs or posts 102, 104 extending downward from cover retainer portion 60. Each post 102, 104 has respective foot portion 106, 108 for fastening first connector housing 18 to floor (not shown), guide rail (not shown) or other structure.

Cover 20 has a flat, T shape with leg portion 112 of its "T" being short and wide relative to top portion 113 of the "T." Distal edge 114 of leg portion 112 has first inclined camming surface or chamfer 116 extending between first side 117 and second side 119 of cover 20. First inclined surface 116 slopes from first or outer side 117 to second or inner side 119 toward forward end 121 of cover 20. First and second edge 118, 120 that define lower edge of top 113 of "T" also have respective second and third inclined camming surfaces or chamfers 122, 124. Second and third angled inclined surfaces 122, 124 also slope from first side 117 to second side 119 toward forward end 121 of cover 20. Cover 20 includes rearward end surface 125. The width W and height H of cover 20 are established to enable cover 20 to slide along sliding axis 40 within cover containment slot 62 in a direction between end cap 26 and first cover holder end wall 74. In a first cover position (as shown on FIG. 4), cover 20 generally covers cavity opening 39. When cover 20 is in a second cover position (as shown on FIG. 10) cavity opening 39, first and second alignment post receiving sockets 96, 98, and electrical contact portion 48 of first terminals 32 are exposed for mating with second connector 14.

Spring 24 is located between cover 20 and end cap 26. Spring 24 is biased to push cover 20 toward first cover holder end wall 74 to first cover position. Thus, cover 20 is biased to cover mating connector receiving cavity 36 at cavity opening 39 when first connector 12 and second connector 14 are disengaged. Spring 24 is preferably a torsion spring. Optionally, spring 24 may be another type of spring such as a compression spring, an extension spring, or a leaf spring. Alternatively, spring may be an integral portion of cover or end cap and may be another type of spring altogether.

Alternatively, in some applications where first and second connectors 12, 14 mate along a horizontal plane, cover 20 can be oriented to slide vertically. In this situation, spring 24 may be omitted because gravity could be used to pull cover 20 to first cover position when connectors 12, 14 are disengaged.

End cap or second stop 26 is generally rectangular in shape and is adapted to fit over second end 78 of cover retainer portion 60. End cap 26 has first and second end cap latch 126a, 126b for attaching end cap 26 to cover retainer portion 60. First and second end cap latches 126a, 126b are adapted to latch onto third and fourth protrusions 100a, 100b located on cover retainer portion 60.

Cover 20 is slidable between a first position (as shown on FIG. 4) where cover 20 is positioned adjacent cover holder first end wall 74 to a second position (as shown on FIG. 10) where cavity opening 39 and electrical contact portion 48 of first terminals 32 are exposed for mating with second connector 14. Cover 20 is oriented within cover containment slot 62 of cover retainer portion 60 such that forward end 121 of cover 20 faces cover holder first end wall 74. Forward end 121 also faces a direction of movement from second position to first position. First side 117 faces away from cavity 36. Cover 20 generally covers cavity opening 39 when cover 20 is located at first position. In an exemplary embodiment, cover 20 is suitable for covering cavity opening 39 to protect electrical contact portion 48 of first terminals 32 from dirt, dust, and debris. Cover 20 is contained within an outer periphery of first connector housing 18. This is advantageous to prevent objects from interfering with cover 20 as it moves.

Shroud floor 22 is generally rectangular in shape and is adapted to fit over shroud portion 52 of first connector housing 18. Shroud floor 22 has a first and a second shroud floor latch 128a, 128b used to attach shroud floor 22 to shroud portion 52. First and the second shroud floor latch 128a, 128b are adapted to latch onto first and second protrusions 54a, 54b located on shroud portion 52.

Second connector 14 include insulative housing 129 having body portion 130, first and second alignment posts 132, 134, alignment post mounting platform 136, and mounting portion 138. Second connector body portion 130 has a plurality of second terminal containment passageways 139 formed therein for receiving second metal terminals 140. Plurality of second terminal containment passageways 139 extend vertically from first surface 142 of body portion 130 to second surface 143 of body portion 130. Body portion 130 includes terminal support platform 131 which provides a presentation surface for second terminals 140. Terminal support platform 131 projects in a direction of insertion of second connector 14 into cavity 36 of first connector 12. Alignment post mounting platform 136 extends laterally from top 143 of body portion 130. First and second alignment posts 132, 134 extend in the insertion direction from first and second opposing ends 144, 146 of bottom surface 152 of alignment post mounting platform 136 in parallel with respect to connection axis A. A distal end of each of first and second alignment posts 132, 134 includes first tapered surface portion 148. Alignment rib 149 (only one shown) extends along each alignment post 132, 134 ending at second tapered surface portion 150. Spring tab 153 is located adjacent each alignment post 132, 134 to aid in the stability of establishing an electrical connection with first connector 12. During the process of inserting second connector 14 into first connector 12, first tapered surface portion 148 on each alignment post 132, 134 cooperates with respective inclined surface 122, 124 on each of corresponding first and second edge 118, 120 of cover 20 (as shown on FIG. 9) to move cover 20 toward second end 76 of cover containment slot 62. Mounting portion 138 extends from top surface 154 of alignment post mounting platform 136 above body portion 130. Mounting portion 138 includes attachment portion 162 for attaching second connector 14 to mounting bracket 16.

Mounting bracket 16 includes channel portion 164 and attachment portion 166. In a preferred embodiment, mounting bracket 16 is adapted to attach second connector to a riser (not shown) of a removable seat (not shown) such as one used in a vehicle. Mounting bracket 16 is flexible to allow second connector 14 to move in an X-Y plane (not shown) which extends orthogonally relative to connection axis A. This enables second connector 14 to engage first connector 12 even when connectors 12, 14 are not fully aligned. Channel portion 164 is adapted to partially contain a wiring harness (not shown) and to shield the wiring harness (not shown) from view. Attachment portion 166 has first and second clamping leg 168, 170. First clamping leg 168 is designed to engage an aperture (not shown) in a seat riser (not shown). Second clamping leg 170 is designed to engage a bottom surface (not shown) on the seat riser (not shown). First and second mounting protrusions 178a, 178b attach to attachment portion 166 of second connector 14. Other approaches for attaching mounting bracket 16 to a seat riser or other structure may be possible.

Alternatively, second connector 14 can be flexibly mounted to a seat riser or other structure without the use of a separate mounting bracket. Alternatively, or in addition, first connector 12 can be flexibly mounted to a floor, a guide rail, or another structure.

The electrical connector assembly 10 of the present invention includes features which allow second connector 14 to engage first connector 12 even when connectors 12, 14 are not fully aligned. Alignment will be enabled as long as tapered surfaces 148, 150 on second connector 14 alignment posts 132, 134 can make contact with first rim 84 in cover holder ceiling 66 on first connector 12. Once contact is made, movement of second connector 14 alignment posts 132, 134 further into first opening 82 in cover holder ceiling 66 on first connector 12 causes mounting bracket 16 to flex, allowing second connector 14 to align with first connector 12.

During insertion movement of second connector 14 with respect to first connector 12, first tapered surface 148 on each alignment post 132, 134 abuts cover 20 along inclined surfaces 122, 124 and first and second edges 118, 120. Further movement of second connector 14 in an insertion direction along connection axis A moves cover 20 along sliding axis 40 past cavity opening 39 enabling terminal support platform 131 and second terminals 140 of second connector 14 to be inserted into cavity 36. Alignment posts 132, 134 are also inserted into respective alignment post receiving sockets 96, 98. When second connector 14 is disengaged from first connector 12, spring 24 urges cover 20 back to cover holder first end wall 74, providing protection for electrical contact portion 48 of first metal terminals 32 when first and second connectors 12, 14 are unmated.

The preferred embodiments shown and described herein are provided merely by way of example and are not intended to limit the scope of the invention in any way. Preferred materials and construction techniques are all illustrative only and are not necessarily required to practice the invention. It is intended that the scope of the present invention herein disclosed should not be limited by the particular disclosed embodiments herein, but should be defined only by a fair reading of the claims that follow.

Further modifications and alterations may occur to others upon reading and understanding the specification. It is intended to include all such modifications and alterations insofar as they come within the scope of the invention. For example, first connector 12 in accordance with the present invention could mate with a variety of mating elements such as a circuit board, an electrical connector including a flexible circuit, or an electrical/electronic device having an electrical connection.

Having thus described the invention, what is claimed is:

1. An electrical connector comprising:
   an insulative housing defining a cavity having an opening for receiving a mating element, said cavity extending from said opening along a connection axis;
   at least one terminal accommodated in said housing, said terminal having a contact portion exposed for mating through said opening with said mating element; and
   a cover slidably retained by said housing, wherein said cover covers said contact portion at said opening when located at a first position, said cover being movable, relative to said housing, along a path to a second position to expose said contact portion for electrical contact with said mating element, said path being generally orthogonal with respect to said connection axis, said cover having an inclined surface portion facing away from said at least one terminal to enable said mating element to push said cover from said first position to said second position.

2. The electrical connector as recited in claim 1, further comprising a spring retained by said housing, said spring biasing said cover toward said first position.

3. The electrical connector as recited in claim 2, further comprising a female alignment member comprising a socket for receiving a male alignment member.

4. The electrical connector of claim 3, wherein said female alignment member further includes a passageway extending between said socket and a passageway opening, said passageway opening being defined by a chamfered rim to receive said male alignment member and facilitate alignment of a misaligned male alignment member during mating.

5. The electrical connector as recited in claim 4, wherein said inclined surface portion extends to an end of said cover.

6. The electrical connector as recited in claim 2, wherein said housing defines an outer periphery, said cover being movable entirely within said outer periphery.

7. An electrical connector comprising:
   a first connector member comprising an insulative first housing adapted to receive at least one conductive first terminal; and
   a second connector member mateable with said first connector member along a connection axis, said second connector member comprising an insulative second housing defining a cavity having a cavity opening adapted to receive said first terminal, said second housing adapted to receive at least one conductive second terminal, said second terminal having a contact portion exposed in said cavity for electrically contacting said first terminal, said second connector member further comprising a cover slidably retained by said second housing, said cover covering said contact portion at said cavity opening when located at a first position, said cover having a surface exposed for mating whereby upon an insertion movement of said first connector member with respect to said second connector member along said connection axis, said first connector member moves said cover along a path toward a second position exposing said cavity opening for said first terminal to enter said cavity and electrically contact said second terminal, said path extending generally perpendicular in relation to said connection axis.

8. The electrical connector as recited in claim 7, wherein said second housing defines an outer periphery, said cover being movable entirely within said outer periphery.

9. The electrical connector as recited in claim 7, wherein said second connector member further comprises a spring biasing said cover toward said first position.

10. An electrical connector comprising:
    a first connector member comprising an insulative first housing adapted to receive at least one conductive first terminal:
    a second connector member comprising an insulative second housing defining a cavity having a cavity opening adapted to receive said first terminal, said second housing adapted to receive at least one conductive second terminal, said second terminal having a contact portion exposed in said cavity for electrically contacting said first terminal, said second connector member further comprising a cover slidably retained by said second housing, said cover covering said contact portion at said cavity opening when located at a first position, said cover having a surface exposed for mating whereby upon an insertion movement of said first connector member with respect to said second connector member said first connector member moves said cover toward a second position exposing said cavity opening for said first terminal to enter said cavity and electrically contact said second terminal, wherein said second connector member further comprises a spring biasing said cover toward said first position; and
    a flexible mounting bracket attached to one of said first and second connector members such that said one of said first and second connector members is free to move in both an X and a Y direction which extend orthogonally with respect to a connection axis, said first connector member further comprising a male alignment member, said second connector member further comprising a female alignment member, wherein during said insertion movement said male and female alignment members cooperate with each other such that one of said first and second connector members is free to move in an X and a Y direction into alignment with the other of said first and second connector members.

11. The electrical connector as recited in claim 10, wherein said male alignment member comprises a projection and said female alignment member comprises a passageway, said passageway extending to a passageway opening for receiving said projection, said passageway opening being defined by a chamfered rim to facilitate alignment of a misaligned male alignment member during mating.

12. The electrical connector as recited in claim 10, wherein said cover has a forward end facing a direction of movement from said second position toward said first position, said cover including an inclined surface portion on a first side which faces away from said cavity opening, said inclined surface portion sloping toward a second side opposite said first side and toward said forward end, and wherein during said insertion movement said male alignment member abuts said inclined surface portion thereby causing said cover to move from said first position toward said second position.

13. An electrical connector comprising:
    a first connector member comprising an insulative first housing, said first housing comprising a first alignment feature, at least one conductive first terminal being mounted in said first housing; and
    a second connector member comprising an insulative second housing which defines an opening adapted to receive said first terminal, said second housing comprising a second alignment feature engageable with said first alignment feature to bring said first and second connector members into alignment when said first and second connector members are advanced toward each other for mating, at least one conductive second terminal being mounted in said second housing, said second terminal having a contact portion exposed in said opening for electrically contacting said first terminal, said second connector member further comprising a cover slidably secured to said second housing, wherein when said cover is located at a first position said cover extends across said opening to generally cover said opening, said cover being movable along a linear path to a second position to expose said contact portion for electrical contact with said first terminal.

14. The electrical connector as recited in claim 13, wherein said second connector member further comprises a spring retained by said housing, said spring biasing said cover toward said first position.

15. The electrical connector as recited in claim 14, wherein said first connector mates with said second connector along a connection axis, said linear path extending generally perpendicular in relation to said connection axis.

16. An electrical connector comprising:
a first connector member comprising an insulative first housing and a male alignment member, at least one conductive first terminal being mounted in said first housing; and
a second connector member comprising an insulative second housing and a female alignment member, said second housing defining an opening adapted to receive said first terminal, at least one conductive second terminal being mounted in said second housing, said second terminal having a contact portion exposed in said opening for electrically contacting said first terminal, said second connector member further comprising a cover slidably secured to said second housing, said cover generally covering said opening when located at a first position, said cover being movable to a second position to expose said contact portion for electrical contact with said first terminal, wherein said second connector member further comprises a spring retained by said housing, said spring biasing said cover toward said first position, wherein said first connector mates with said second connector along a connection axis, said cover being movable along a path extending generally perpendicular in relation to said connection axis, wherein during a mating movement of said first connector member with respect to said second connector member said male and female alignment members cooperate with each other to bring said first and second connector members into alignment.

17. The electrical connector as recited in claim 16, wherein said cover has a forward end facing a direction of movement from said second position toward said first position, said cover including an inclined surface portion on a first side which faces away from said opening, said inclined surface portion sloping toward a second side opposite said first side and toward said forward end, wherein during said mating movement said first connector member abuts said inclined surface portion to move said cover toward said second position.

18. The electrical connector as recited in claim 13, wherein said second housing defines an outer periphery, said cover being movable entirely within said outer periphery.

19. An electrical connector comprising:
a first connector member comprising an insulative first housing, at least one conductive first terminal being mounted in said first housing;
a second connector member comprising an insulative second housing which defines an opening adapted to receive said first terminal, at least one conductive second terminal being mounted in said second housing, said second terminal having a contact portion exposed in said opening for electrically contacting said first terminal, said second connector member further comprising a cover slidably secured to said second housing, said cover generally covering said opening when located at a first position, said cover being movable to a second position to expose said contact portion for electrical contact with said first terminal; and
a flexible mounting member attached to one of said first and second connector members such that said one of said first and second connector members is free to move in both an X and a Y direction which extend orthogonally with respect to a connection axis, wherein said first connector member further comprises a male alignment member, and wherein said second connector member further comprises a female alignment member, whereby during a mating movement of said first connector member with respect to said second connector member said male and female alignment members cooperate with each other such that one of said first and second connector members is free to move in an X and a Y direction into alignment with the ocher of said first and second connector members.

20. An electrical connector comprising:
a first connector member comprising an insulative first housing and at least one conductive first terminal mounted in said first housing, said first connector member including a first alignment feature;
a second connector member comprising an insulative second housing and at least one conductive second terminal mounted in said second housing, said second housing defining an opening adapted to receive said first terminal, said second terminal having a contact portion exposed in said opening for electrically contacting said first terminal, said second connector member further comprising a cover secured to said second housing, said cover generally covering said opening when located at a first position, said cover being movable to a second position to expose said contact portion for electrical contact with said first terminal, said second connector member being mateable with said first connector member along a connection axis; and
a flexible mounting member attached to one of said first and second connector members, said mounting member enabling movement of said one of said first and second connector members in a direction generally orthogonal to said connection axis, said mounting member thereby enabling said first and second alignment features to mutually cooperate and guide said connector members into alignment as said connector members are moved toward each other during mating.

* * * * *